United States Patent [19]

De Lange

[11] Patent Number: 5,277,545
[45] Date of Patent: Jan. 11, 1994

[54] VAPOR EMISSION CONTROL

[75] Inventor: Jacobus A. M. T. H. De Lange, Gravenhage, Netherlands

[73] Assignee: Flexibox Limited, Manchester, United Kingdom

[21] Appl. No.: 822,339

[22] Filed: Jan. 17, 1992

[30] Foreign Application Priority Data

Jan. 18, 1991 [GB] United Kingdom ............... 9101148
Jul. 12, 1991 [GB] United Kingdom ............... 9115076

[51] Int. Cl.$^5$ ............................................. F01D 25/32
[52] U.S. Cl. ............................... 415/168.1; 415/168.2; 55/502
[58] Field of Search ............... 415/168.1, 168.2; 55/502, 270

[56] References Cited

U.S. PATENT DOCUMENTS

| 1,520,939 | 12/1924 | Dorer | 415/168.2 |
| 4,722,662 | 2/1988 | Morgan | 415/168.1 |
| 4,734,019 | 3/1988 | Eberhardt | 415/168.2 |
| 4,737,171 | 4/1988 | Courbon | 55/270 |
| 4,973,222 | 11/1990 | Osaki et al. | 415/168.1 |
| 5,131,806 | 7/1992 | Taga | 415/168.1 |

FOREIGN PATENT DOCUMENTS 9001667  10/1990  PCT Int'l Appl. .

Primary Examiner—John T. Kwon
Attorney, Agent, or Firm—Woodard, Emhardt, Naughton, Moriarty & McNett

[57] ABSTRACT

A vapor emission control system for preventing the emission to the atmosphere of vapor leaking from a seal of a rotating machine. A containment vessel defines a chamber into which any vapor leaking form the seal must flow. An emission control device is connected to an outlet from the chamber, the emission control device being arranged to render innocuous any vapor delivered thereto through the outlet. Any vapor within the chamber is pumped through the outlet to the emission control device. Thus any vapor leaking into the chamber can only leave the chamber via the emission control device.

19 Claims, 6 Drawing Sheets

VAPOR EMISSION CONTROL

This invention relates to a system for the control of vapour emissions from machines such, for example, as pumps, compressors and mixers or any other machine which contains, and/or transports, and/or handles fluid from which toxic vapour may leak.

The invention is especially but not exclusively concerned with the control of hydrocarbon vapour emission from pumps and for convenience reference will be made in a non-restrictive sense solely to "hydrocarbon vapour emission" and "pumps".

There is a growing demand for zero vapour emission from pumps in industry, especially in the chemical, petrochemical and petroleum industries, and it is considered that such demand will eventually become the norm.

One possible solution available to this problem of vapour emission control and the attainment of zero vapour emission is the use of hermetically sealed pump units which may either be a pump/motor unit with a glandless electric motor or a pump/motor unit incorporating a magnetic coupling.

However, hermetically sealed pump units are not widely acceptable in industry due, inter alia, to low efficiency and difficult and costly maintenance.

U.S. Pat. No. 4,722,662 describes a vapour emission control system for a pipe line pump including a shaft mounted on bearings supported at opposite ends of a housing. Shaft seals are located inboard of the bearings, and fluid leakage collection spaces are defined around the shaft seals. A vapour absorbtion unit, for example a canister of activated carbon, is connected to the collection spaces. This arrangement works satisfactorily, but leakage can still occur if leaks develop in the collection spaces, particularly if the vapour pressure in the collection spaces rises significantly above atmospheric pressure.

It is, an object of the present invention to provide a solution to the problem of hydrocarbon vapour emission and the attainment of zero emission to the surrounding atmosphere.

According to the present invention, there is provided a vapour emission control system for preventing the emission to the atmosphere of vapour leaking from a seal of a machine, comprising a containment vessel defining a chamber into which any vapour leaking from the seal must flow, an outlet from the chamber, an emission control device connected to the outlet, the emission control device being arranged to render innocuous any vapour delivered thereto through the outlet from the chamber, and pumping means for pumping vapour within the chamber through the outlet to the emission control device.

An example of a suitable emission control device is disclosed in published International Patent Specification No. WO91/06793. The disclosed device comprises a disposable cartridge containing an active carbon filter with which the hydrocarbon vapour reacts to become innocuous or inert.

It is to be clearly understood however that other emission control devices may be employed.

The pumping means preferably comprises a pump assembly located within the chamber and driven by the machine, for example a vane assembly mounted on a shaft of the machine, the outlet communicating with the chamber at a position radially outside the vane assembly. Alternatively or in addition, the pumping means may comprise a pump connected between the outlet and the emission control device. Means may be provided for injecting a dry inert gas into the chamber.

The invention may be implemented in any of a wide range of alternative configurations. For example, the machine may comprise a pump/motor set located within and encapsulated by the chamber.

Alternatively, the machine may comprise a pump/motor set located within the chamber, the motor incorporating a cooling fan arranged to pump air into the chamber.

As a further alternative, the machine may comprise a pump/motor set, the pump being located within the chamber and linked by a drive shaft to the motor which is located outside the chamber.

As a still further alternative, the machine may comprise a housing from which at least one shaft extends, the chamber being defined around the shaft by a casing mounted on the housing. The said at least one shaft may extend through said casing, a shaft seal being defined between the shaft and the casing. The said shaft seal may comprise two axially spaced seals defining a space therebetween, injecting means being arranged to inject inert gas into said space.

The said shaft seal may comprise a lip seal arranged to lift from the shaft when the pumping means is operating. Alternatively, the said shaft seal may comprise a magnetic seal.

Embodiments of the present invention will now be described, by way of example, with reference to the accompanying drawings, in which.

Figure 1:
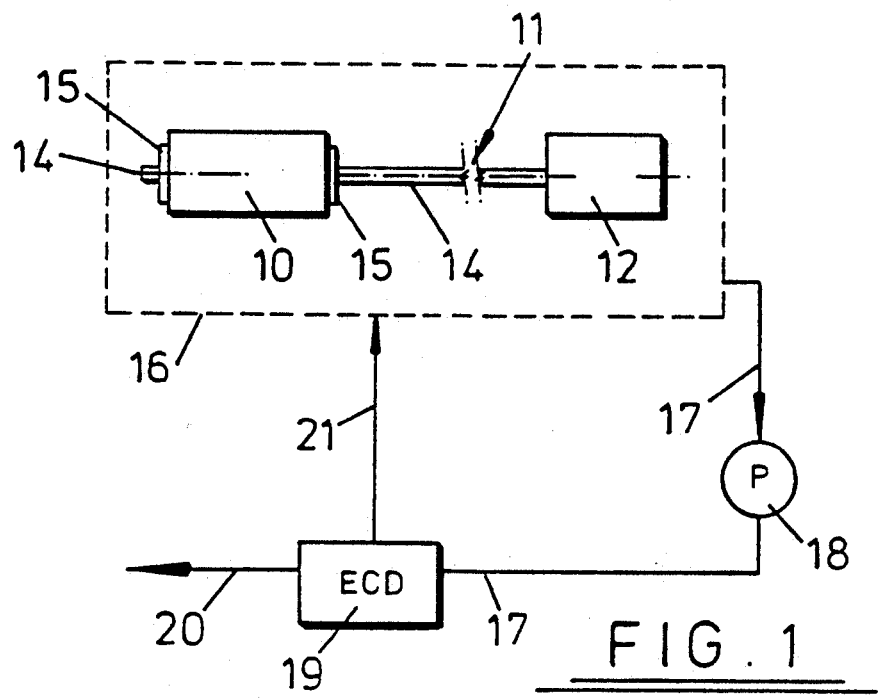
FIGS. 1 to 6 illustrate diagrammatically different solutions to the problem of hydrocarbon vapour emission in accordance with the present invention.

Referring to FIG. 1, this illustrates a machinery set comprising a conventional centrifugal pump 10 driven via a flexible coupling 11 by a conventional air cooled electric motor 12. The bearing housings incorporating mechanical seals for the pump shaft 14 are indicated at 15.

For environmental purposes, it is desirable to have zero hydrocarbon vapour emission from the centrifugal pump 10 into the atmosphere and the solution provided in by the present invention is to contain such vapour leaking from the pump and to pass the vapour to a control device where the hydrocarbon vapour emission is treated to render it innocuous or inert so that it can be dispersed safely to atmosphere.

In FIG. 1 this is effected by encapsulating the pump/motor set 10 to 15 in a casing 16 which is connected by piping or ducting 17 incorporating an independently powered evacuation pump 18 to a vapour emission control device 19 which may, inter alia, comprise, as hereinbefore mentioned, a disposable active carbon-containing cartridge. The casing 16 defines a chamber the pressure within which is maintained at a level below atmospheric such that if the casing 16 is not perfectly sealed leakage will be into the chamber. This ensures that no vapour can escape the chamber except via the ECD 19.

The treated vapour, now rendered innocuous or inert by the ECD, may be dispersed to atmosphere as at 20 and/or returned into the casing 16 as indicated at 21.

In the following alternative embodiments, the pump-/motor set components are indicated by the same references 10 to 15 where appropriate and/or convenient.

Figure 2:
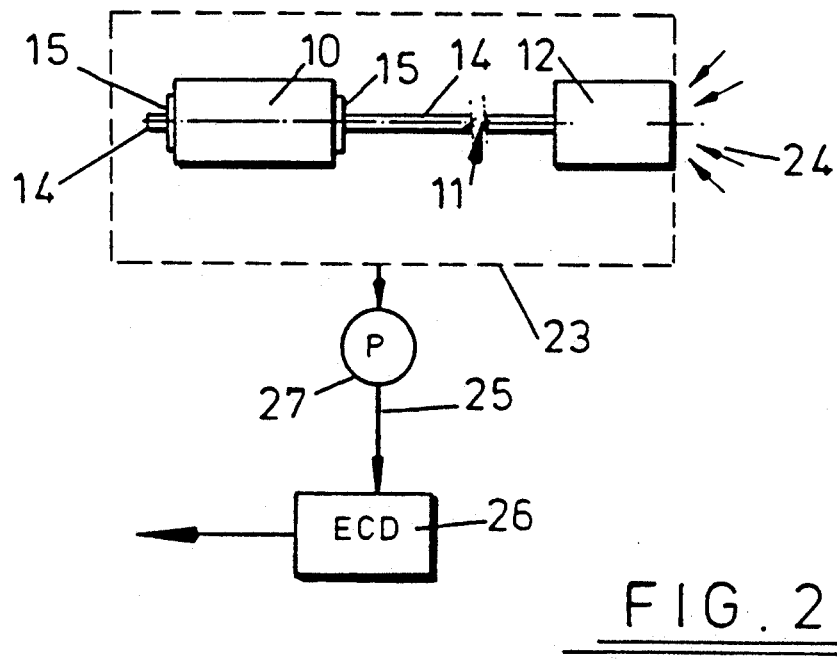

In FIG. 2, an encapsulating casing 23 terminates at the end of the air cooled electric motor 12 remote from the pump 10 and the cooling air indicated by the arrows 24 passing through the motor 12 sweep the hydrocarbon vapour from the casing 23 through ducting 25 into the emission control device 26. An evacuation pump 27 may be incorporated in the ducting to assist removal of the contained hydrocarbon vapour.

Figure 3:
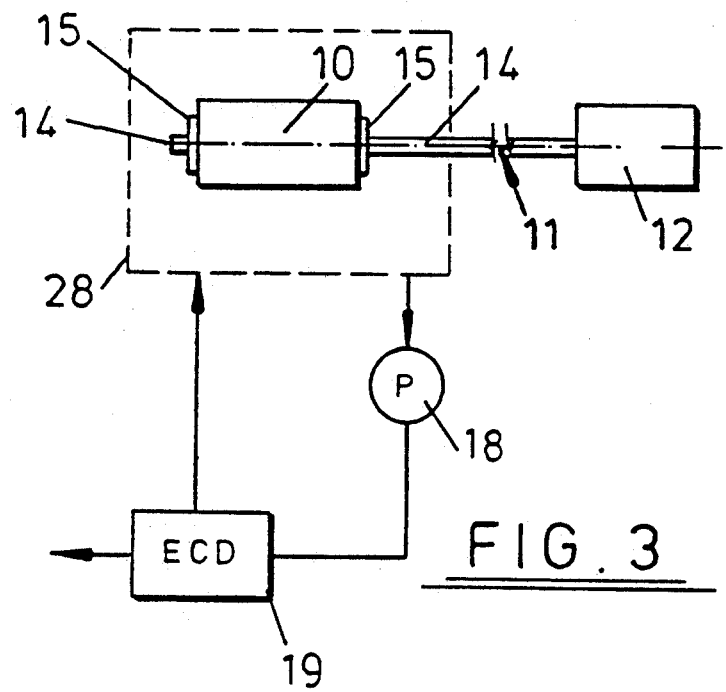

In FIG. 3, only the pump 10 and its end bearing housings with incorporated mechanical seals generally indicated at 15 are encapsulated in a vapour-containing casing 28. A pump 18 and ECD 19 are arranged in the same manner as in the arrangement of FIG. 1.

Figure 4:
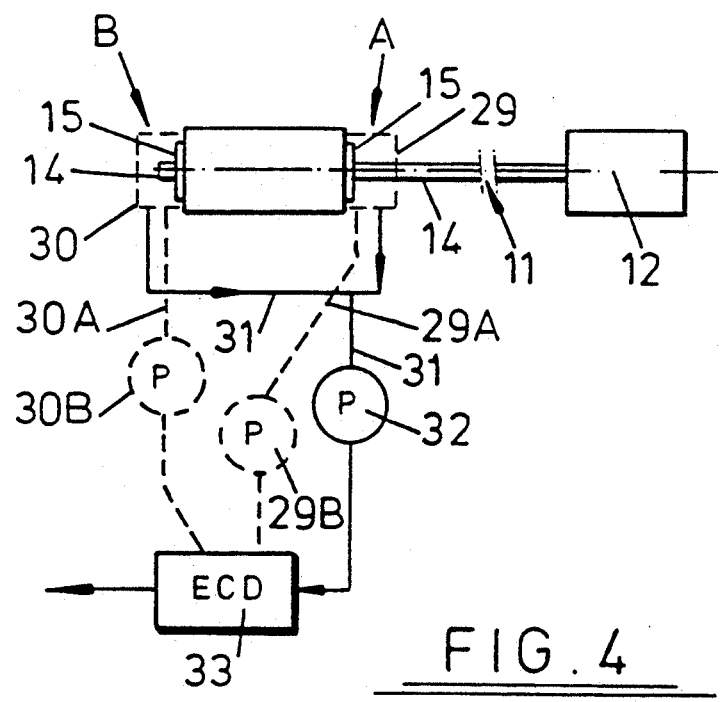

In FIG. 4, the pump 10 has its hydrocarbon vapour emission contained by means of shaft end encapsulation. More specifically, the driven shaft end A of the centrifugal pump 10 with its associated bearing housing and incorporated mechanical seal 15 in encapsulated in a vapour-containing cocoon 29 while the other shaft end B is similarly encapsulated in a vapour-containing cocoon 30, both cocoons 29 and 30 being connected by ducting 31 incorporating an evacuation pump 32 to an emission control device 33.

Alternatively each cocoon 29, 30 may be connected by separate ducting 29A, 30A incorporating an evacuation pump 29B, 30B to the emission control device 33.

Figure 5:
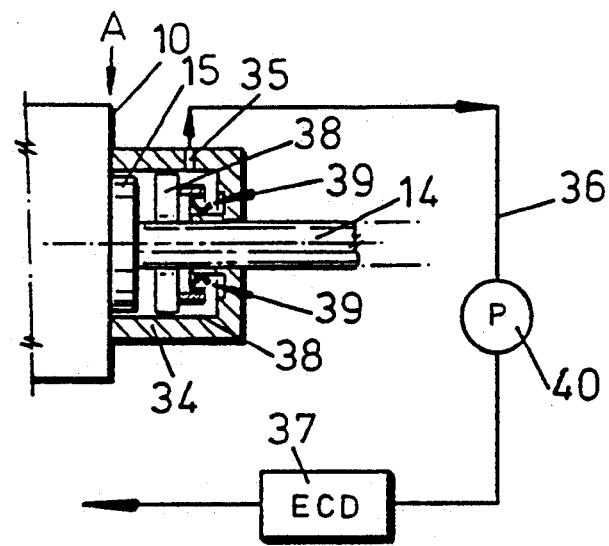

FIG. 5 illustrates the driven shaft end A of a centrifugal pump 10. In this arrangement, an encapsulating cocoon is indicated at 34 and has an outlet port 35 for egress of hydrocarbon vapour via ducting 36 to an emission control device 37. Impeller blades 38 are fastened to, or integral with, the pump shaft 14 and support a lip or other seal 39 which runs on a sealing face defined by a radially outer surface of a tubular extension of the cocoon 34.

With this arrangement, when the pump shaft 14 rotates, any hydrocarbon vapour emitted is forced by the impeller blades 38 out of the port 35 to the emission control device 37, the lip seal 39 tending to open during such rotation. As illustrated, an external evacuation pump 40 may be incorporated in the ducting 36 to assist vapour removal from the encapsulating cocoon 34 and its delivery to the emission control device 37. Alternatively, the pump 40 may be omitted. With the centrifugal pump 10 stationary, the lip seal 39 seals on the radially outer face of the tubular extension of the cocoon 34 to prevent hydrocarbon vapour emission to atmosphere out of the cocoon 34.

Figure 6:
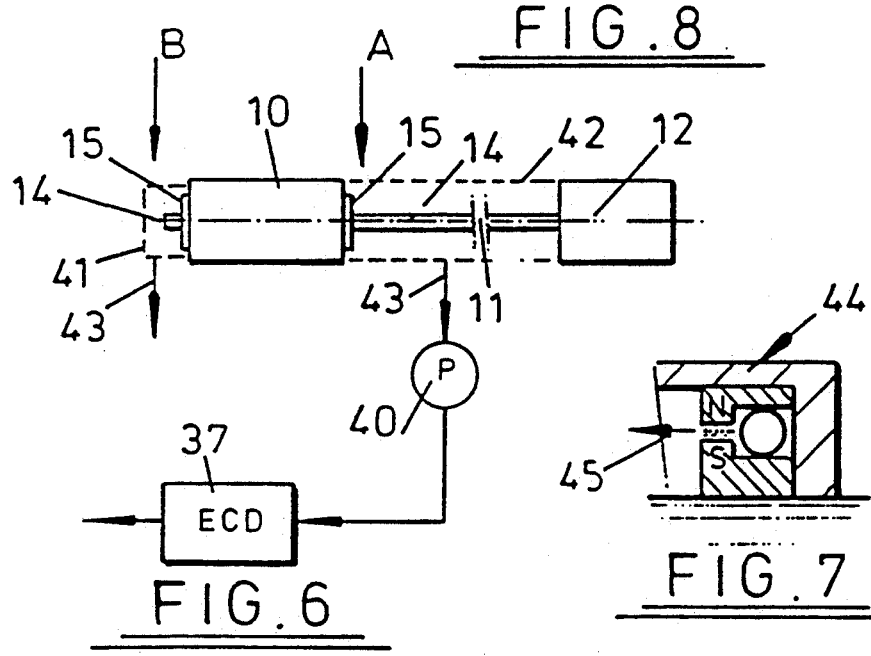

Referring to FIG. 6, in the illustrated arrangement a shaft end B is encapsulated in a cocoon 41 while the shaft end A is encapsulated in a cowl 42 bridging the centrifugal pump 10 and the electric motor 12. Both the cocoon 41 and the cowl 42 are connected to the emission control device 37 by ducting 43 with the intervention of one or more evacuation pumps 40.

Figure 7:
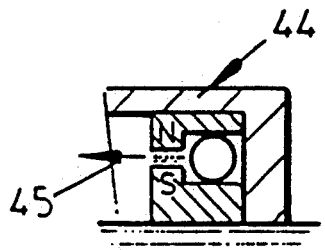
FIG. 7 illustrates a magnetic bearing which may be incorporated in the arrangement of FIG. 6.

Alternatively, or additionally, the bearing housing 15 at shaft end A incorporates a magnetic bearing 44 as shown in FIG. 7. Hydrocarbon vapour can be extracted from the space between the bearing 44 and the mechanical seal (not shown), such extraction being generally indicated by arrow 45.

Figure 8:
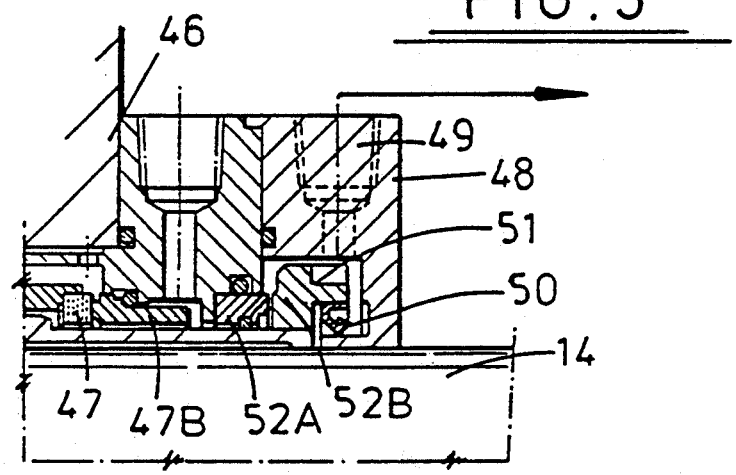
FIGS. 8, 9, 10 and 11 illustrate further seal assemblies which may be incorporated in an arrangement of the general type illustrated in FIG. 5.

The embodiment of FIG. 5 is advantageous in that it incorporates a pumping impeller within the chamber defined by cocoon 34. This is sufficient to meet purely environmental requirements in preventing emissions, but where safety considerations also must be taken into account to deal with for example main seal failure a preferred solution is shown, by way of example, in FIG. 8.

In this embodiment, the shaft 14 is shown traversing a housing 46 of the centrifugal pump 10 with an intervening primary mechanical seal 47A, 47B. An encapsulating cocoon is indicated at 48 with its outlet port at 49. A lip seal is indicated at 50 and the impeller blades rotatable with the shaft 14 at 51.

To build in a safety factor to this arrangement, there is provided between the primary seal 47A, 47B and the impeller blades 51 a secondary or standby mechanical seal 52A, 52B adapted to become operational upon failure of the primary mechanical seal 47A, 47B.

Thus, it is to be noted that the shaft end encapsulation solution offered by the present invention to the problem of hydrocarbon vapour emission may be a purely environmental one or may be both an environmental and a safety one.

It is to be noted that as conventional electric motors and centrifugal pumps are used without change, the pump/motor sets will retain their normal efficiencies which are substantially better than those of hermetically sealed pump units. Furthermore, the arrangements of by the present invention permit the conversion of existing and long-established pump/motor sets to give a zero hydrocarbon vapour emission end result.

Figure 9:
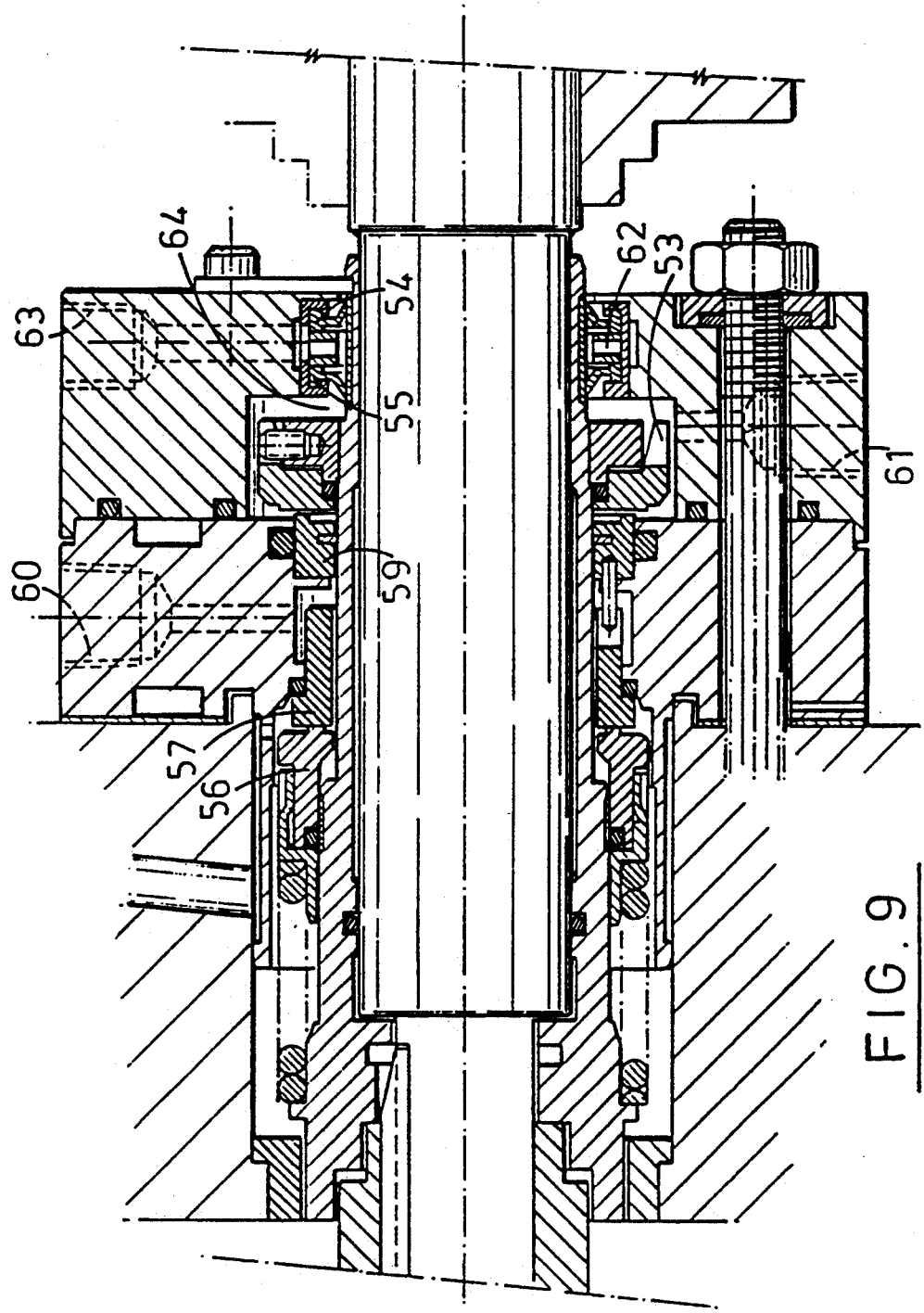

Referring to FIG. 9, a further embodiment of the invention is illustrated which may be used in a configuration such as that illustrated in FIG. 5. The embodiment of FIG. 9 not only incorporates a pumping ring defining impeller blades 53, but also incorporates a double lip seal 54, 55 configured to enable an inert dry gas such as dry nitrogen to be injected into the chamber within which the blades 53 rotate. Depending upon local conditions, it may be necessary to exclude water vapour from the chamber to prevent the risk of a build-up of ice.

A prime seal is defined between a spring-biased rotating member 56 and a stationary member 57, and a stand-by seal is defined between rotating member 58 and stationary member 59. If the flare stack fails, fluid leaking past the stand-by seal forces member 59 to the right in FIG. 9 to close the stand-by seal. Fluids between the prime and back-up seals may be delivered to for example a prime seal via an outlet at 60. Any vapour leaking past the back-up seal is contained within the assembly and pumped to an ECD device (not shown) via an outlet indicated at 61 as a result of rotation of the blades 53.

Dry nitrogen is injected into a space 62 defined between the seals 54, 55 via an inlet indicated at 63. When the blades 53 are rotating, the pressure in region 64 adjacent the inboard side of the inner seal 55 is less than atmospheric, and the pressure in space 62 is sufficient to lift the seal 55 but not the seal 54. Thus nitrogen gas escapes past seal 55 and flushes out the chamber around the blades 53. When the blades 53 are stationary, both the seals 54 and 55 seat against the radially outer surface of the shaft preventing any leakage.

Figure 10:
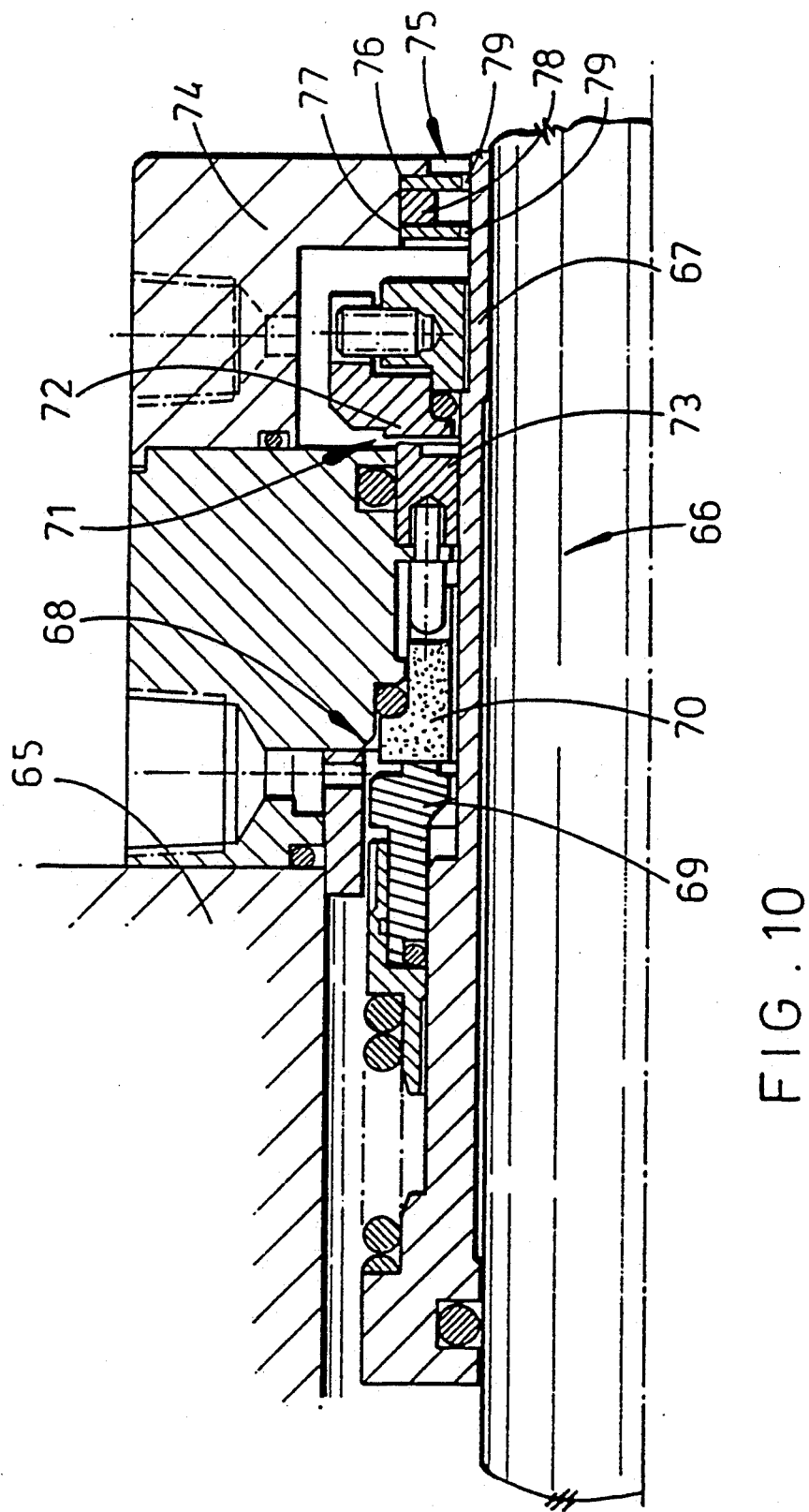

Referring now to FIG. 10, this illustrates an embodiment which is similar to that of FIG. 9 but incorporates a magnetic seal outboard of the primary and back-up seals. The arrangement comprises a pump housing 65 and a rotatable pump shaft 66, the latter being surrounded by a shaft sleeve 67. A primary mechanical seal 68 comprises a spring loaded rotating seal ring 69 and a stationary seal ring 70. A secondary back up mechanical seal 71, which normally runs open, comprises a rotating seal ring 72 and a stationary seal 73. Any vapour leaking past the back-up seal is pumped away by a rotating impeller via an outlet indicated in broken lines.

An end plate 74 of the housing 65 supports a magnetic seal 75. The latter comprises two axially-spaced annular metal plates 76, 77 sandwiching therebetween a magnetic annulus 78.

There is an annular gap 79 between each plate 76, 77 and the shaft sleeve 67 and, when the mechanical seal of FIG. 10 is being assembled within the pump, these gaps are filled with a ferrous-containing hydraulic fluid (oil) using a syringe or pipette.

Figure 11:
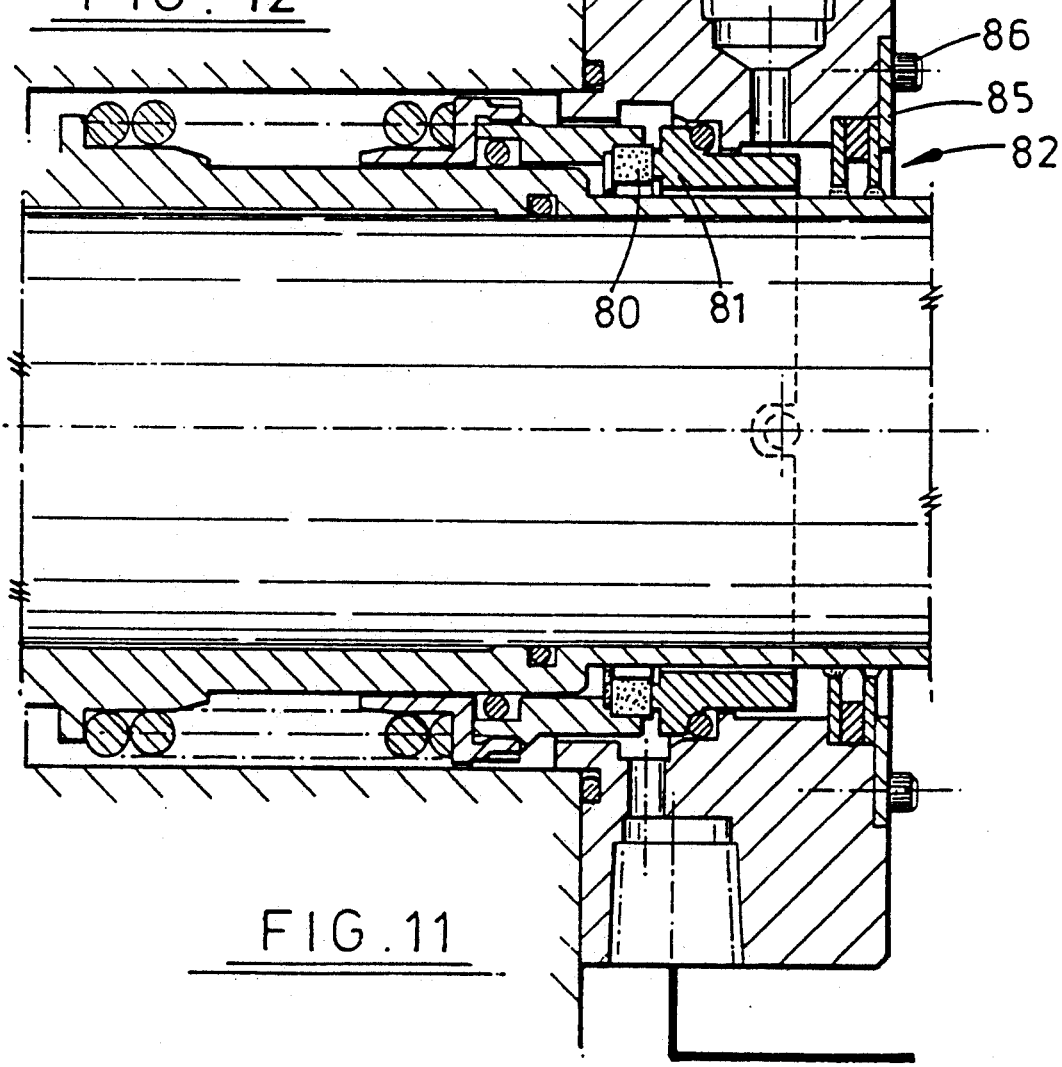

The arrangement of FIG. 11 is similar to that of FIG. 10 but omitting the back-up seal. The primary seal comprises a rotating seal ring 80 and a stationary seal 81, and a magnetic seal 82 is provided adjacent the shaft end. There is no impeller to pump away vapour from the inboard side of the seal 82 and accordingly an outlet 83 is connected via a pipe indicated by line 84 to an external pump (not shown). The magnetic seal is clamped in position relative to the housing by an annular plate 85 and bolts 86.

Figure 12:
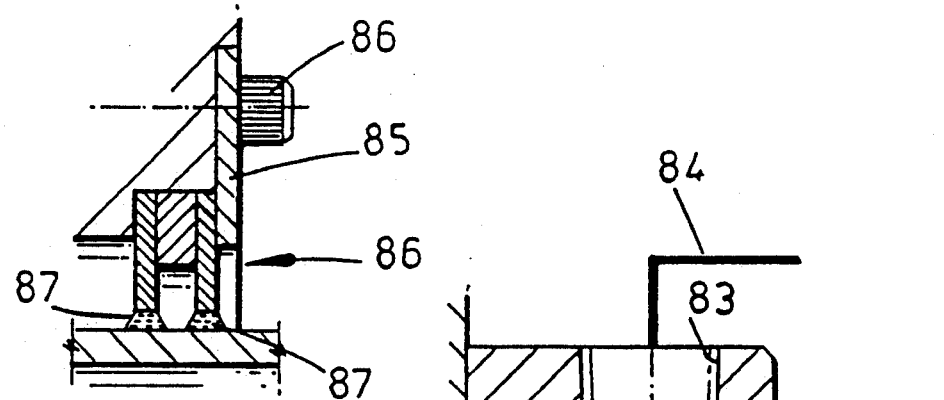
FIG. 12 illustrates a portion of FIG. 11 to an enlarged scale.

FIG. 12 illustrates the structure of the magnetic seal of FIG. 11 in greater detail. The magnetic seal of FIG. 10 has the same structure. The ferrous-containing hydraulic fluid is indicated by regions 87.

The magnetic seals of FIGS. 10 to 12 serve to contain toxic or other vapours within the pump assembly. More specifically, the magnetic seals provide an impermeable barrier to toxic fluids, preventing discharge of low pressure vapours emitting along the shaft. They are non contacting in nature, and therefore non-wearing, thus providing a long working life, especially if a standby seal is provided to protect against high pressure even in the event of primary seal failure. During pump operation, the space inboard of the magnetic seals is partially evacuated to prevent any build up of pressure which might break the magnetic seals.

We claim:

1. A vapour emission control system for preventing the emission to the atmosphere of vapour leaking from a seal of a machine, comprising a containment vessel provided with an outlet and defining a chamber into which any vapour leaking from the seal must flow, an emission control device communicating with said outlet and capable of rendering a vapour innocuous delivered thereto, a means for pumping vapour from said chamber to said emission control device, and a means for injecting a dry inert gas into said chamber.

2. A vapour emission control system according to claim 1, wherein the pumping means comprises a pump assembly located within the chamber and driven by the machine.

3. A vapour emission control system according to claim 2, wherein the pumping assembly comprises a vane assembly mounted on a shaft of the machine, the outlet communicating with the chamber at a position radially outside the vane assembly.

4. A vapour emission control system according to claim 1, wherein the pumping means comprises a pump connected between the outlet and the emission control device.

5. A vapour emission control system according to claim 1, wherein the machine comprises a pump and motor set encapsulated by said chamber.

6. A vapour emission control system according to 1, wherein the machine comprises a pump and motor set, the pump being located within the chamber and linked by a drive shaft to the motor which is located outside the chamber.

7. A vapour emission control system for preventing the emission to the atmosphere of vapour leaking from a seal of a machine, comprising a containment vessel provided with an outlet and defining a chamber into which any vapour leaking from the seal must flow, an emission control device communicating with said outlet and capable of rendering a vapour innocuous delivered thereto, a means for pumping vapour from said chamber to said emission control device, and a pump and motor set located within said chamber, said motor including a cooling fan arranged to pump air into said chamber.

8. A vapour emission control system according to claim 7, wherein the pumping means comprises a pump assembly located within the chamber and driven by the machine.

9. A vapour emission control system according to claim 8, wherein the pumping assembly comprises a vane assembly mounted on a shaft of the machine, the outlet communicating with the chamber at a position radially outside the vane assembly.

10. A vapour emission control system according to claim 7, wherein the pumping means comprises a pump connected between the outlet and the emission control device.

11. A vapour emission control system for preventing the emission to the atmosphere of vapour leaking from a seal of a machine, comprising a containment vessel provided with an outlet and defining a chamber into which any vapour leaking from the seal must flow, an emission control device communicating with said outlet and capable of rendering a vapour innocuous delivered thereto, a means for pumping vapour from said chamber to said emission control device, a casing further defining said chamber, said casing positioned around at least one shaft of the machine and mounted to a housing of the machine, and a lip seal defined between said casing and the shaft, said lip seal arranged to lift from the shaft when said pumping means is operating.

12. A vapour emission control system according to claim 11, wherein the pumping means comprises a pump assembly located within the chamber and driven by the machine.

13. A vapour emission control system according to claim 12, wherein the pumping assembly comprises a vane assembly mounted on a shaft of the machine, the outlet communicating with the chamber at a position radially outside the vane assembly.

14. A vapour emission control system according to claim 11, wherein the pumping means comprises a pump connected between the outlet and the emission control device.

15. A vapour emission control system for preventing the emission to the atmosphere of vapour leaking from a seal of a machine, comprising a containment vessel provided with an outlet and defining a chamber into which any vapour leaking from the seal must flow, an emission control device communicating with said outlet and capable of rendering a vapour innocuous delivered thereto, a means for pumping vapour from said chamber to said emission control device, a casing further defining said chamber, said casing positioned around at least one shaft of the machine and mounted to a housing of the machine, and a magnetic seal defined between said casing and the shaft.

16. A vapour emission control system according to claim 15, wherein the pumping means comprises a pump assembly located within the chamber and driven by the machine.

17. A vapour emission control system according to claim 16, wherein the pumping assembly comprises a vane assembly mounted on a shaft of the machine, the outlet communicating with the chamber at a position radially outside the vane assembly.

18. A vapour emission control system according to claim 15, wherein the pumping means comprises a pump connected between the outlet and the emission control device.

19. A vapour emission control circuit according to claim 11 or claim 15, wherein said shaft seal comprises two axially spaced seals defining a space therebetween, and an injecting means is arranged to inject inert gas into said space.

* * * * *